R. A. FORBES.
WEIGHING SCALE.
APPLICATION FILED MAY 19, 1913.

1,134,675.

Patented Apr. 6, 1915.

WITNESSES:

INVENTOR
ROBERT A. FORBES
BY
ATTORNEY

UNITED STATES PATENT OFFICE.

ROBERT A. FORBES, OF HAMILTON, OHIO, ASSIGNOR TO THE ANDERSON TOOL COMPANY, OF HAMILTON, OHIO, A CORPORATION.

WEIGHING-SCALE.

1,134,675.  Specification of Letters Patent.  Patented Apr. 6, 1915.

Application filed May 19, 1913. Serial No. 768,581.

*To all whom it may concern:*

Be it known that I, ROBERT A. FORBES, a citizen of the United States, and a resident of Hamilton, county of Butler and State of Ohio, have invented a certain new and useful Weighing-Scale; and I do hereby declare that the following is a full, clear, and exact description thereof, reference being had to the accompanying drawings, in which like letters refer to like parts.

The object of this invention is to improve the construction of platform checks in weighing scales. It applies to either a high or a low check, although the form herein shown is a high check, the low check being located beneath the platform.

It has been customary heretofore to use a single check, but it has not been satisfactory because, while the check will take care of variations in weighing when the load is on the front or back edge of the platform, it does not very well care for the variations arising when the load is placed on either the right or left side of the platform.

The chief feature of the invention consists in using a plurality of checks so as to prevent the lateral rocking movement of the platform and intermediate connections as well as to prevent the other rocking movement of the platform.

The nature of the invention will be understood from the accompanying drawings and the following description and claims.

Figure 1:
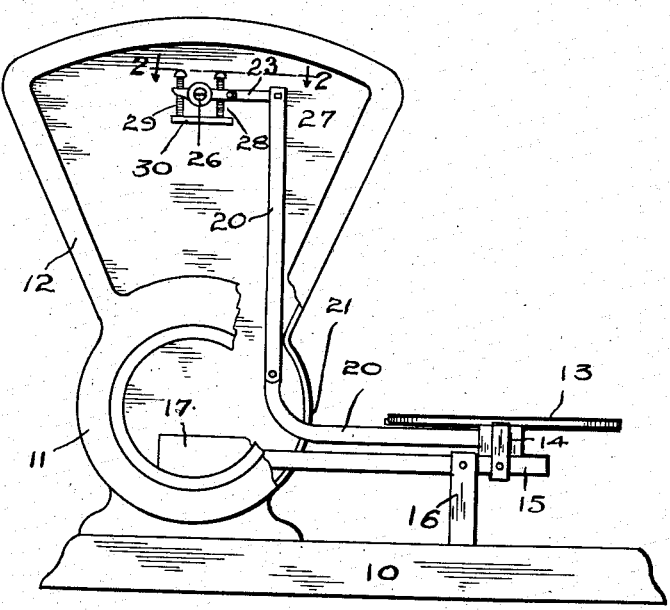
Figure 2:
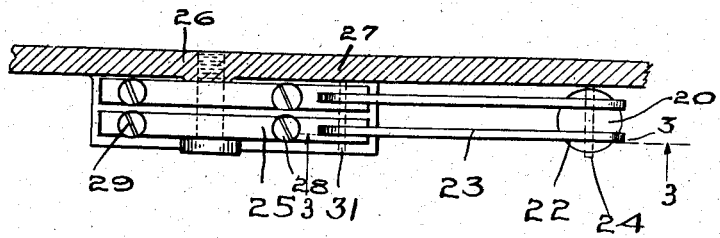
Figure 3:
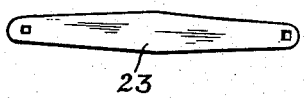

In the drawings, Figure 1 is a side elevation of a weighing scale with the front housing and other parts removed and parts broken away. Fig. 2 is a section on the line 2—2 of Fig. 1, but on an enlarged scale. Fig. 3 is a section on the line 3—3 of Fig. 2.

In Fig. 1 there is shown a base 10 and lower housing 11 and upper housing 12 of a weighing scale of familiar type. There is a platform 13 supported on a frame 14 which is fulcrumed on a scale beam 15, and said scale beam is fulcrumed between its ends on a bearing stand 16 arising from the base. The inner end of the scale beam 15 is weighted at 17. There is a check bar 20 which is secured rigidly to the platform frame support 14 and extends horizontally through a slot 21 in the lower housing and thence vertically almost to the upper end of the upper housing. The upper end of said bar has two vertical recesses at 22, one near each side and in said recesses links 23 are set and pivoted by a pin 24. The other end of each of said links 23 is fulcrumed in an adjusting lever 25 which is fulcrumed midway on a screw 26 secured to a back plate 27 of the upper housing, and said lever 26 is adjusted and held accurately in place by two set screws 28 and 29 extending through it, one on each side of the fulcrum, and bearing on and engaging a plate 30 secured to the back plate 27 of the housing. There are two of said adjusting levers 25, as shown in Fig. 2, located side by side and independently adjustable. The function of these adjusting levers 25 is to change the vertical position of the fulcrum or inner ends of the links 23 to accommodate the rest of the check apparatus to properly act in maintaining the platform horizontal during the various weighing operations. Therefore, by the screws 28 and 29, the right-hand end of either adjusting lever 25 may be moved downward or upward. It is necessary that said parts be absolutely accurate in position and held there with absolute positiveness. Furthermore, it is desirable that the links 23 fit snugly in the recess 22 in the upper end of the check bar 20 and also snugly in corresponding recesses in the ends of the adjusting levers 25 so that there cannot be any lateral play or rocking movement of the check bar 20 and platform 13. This is further facilitated by squaring the middle portions of the pivot pins 24 and 31 and also squaring the holes through the links 23 so that the pivot pins will fit snugly in the links. The ends of the pivot pins are round, but also fit snugly in their bearings. Therefore, with this construction, the upper end of the check bar 20 can have no lateral rocking movement, that is, cannot be rocked toward or away from the back plate 27 of the upper housing. This sort of rocking movement of the check bar has been the difficulty in the check mechanisms heretofore employed in weighing scales. Without this positive and accurate mounting of the parts and without the prevention of the lateral rocking movement of the bar 20 and platform 13, the scale will not operate accurately, for if the parts can be thrown to one side or the other when the load happens to be placed on one side or the other of the platform, there will be influences which will render the scale correspondingly inaccurate.

I claim as my invention:

1. A weighing scale including a platform check bar, a plurality of parallel check links pivoted at one end thereof near each side of the bar, and fixed means to which the other ends of said links are pivoted, said check bar and fixed means being recessed to snugly receive the ends of the check links.

2. A weighing scale including a platform check bar, a plurality of parallel check links pivoted at one end thereof near each side of the bar, fixed means to which the other ends of said links are pivoted, said check bar and fixed means being recessed to snugly receive the ends of the check links and the check links being provided with angular holes, and pivot pins with angular portions fitting in said holes.

3. A weighing scale including a platform check bar, a plurality of parallel check links pivoted at one end thereof near each side of the bar, a fulcrum lever with which each link is pivoted, means for fulcruming said fulcrum levers parallel and between their ends, a fixed plate, and set screws extending through each fulcrum lever on each side of the fulcrum thereof and engaging said plate for adjusting said levers.

In witness whereof, I have hereunto affixed my signature in the presence of the witnesses herein named.

ROBERT A. FORBES.

Witnesses:
JNO. L. JACKSON,
EMIL MENZ.